May 31, 1932. F. WACKER ET AL 1,861,199
HEADLIGHTS FOR VEHICLES
Filed Jan. 7, 1930   6 Sheets-Sheet 1

Fig.1

May 31, 1932. F. WACKER ET AL 1,861,199
HEADLIGHTS FOR VEHICLES
Filed Jan. 7, 1930  6 Sheets-Sheet 2

Fig.12

Patented May 31, 1932

1,861,199

UNITED STATES PATENT OFFICE

FRITZ WACKER, HERMANN BLUM, AND HANS GREISSINGER, OF NUREMBERG, AND FRIEDRICH RICHARD DIETRICH, OF PASING, NEAR MUNICH, GERMANY

HEADLIGHTS FOR VEHICLES

Application filed January 7, 1930, Serial No. 419,064, and in Germany April 11, 1929.

Our invention relates to a device for turning the headlights of vehicles in accordance with the angular position of the steering wheels. It relates in particular to steering gear operated headlights disclosed and claimed in the U. S. Patent No. 1,788,190 to Richard Dietrich, one of the co-inventors in the present application, and involves certain further improvements of that type of headlight gear, as will appear from the following description.

Our invention is described with reference to the accompanying drawings, in which—

Figure 1:
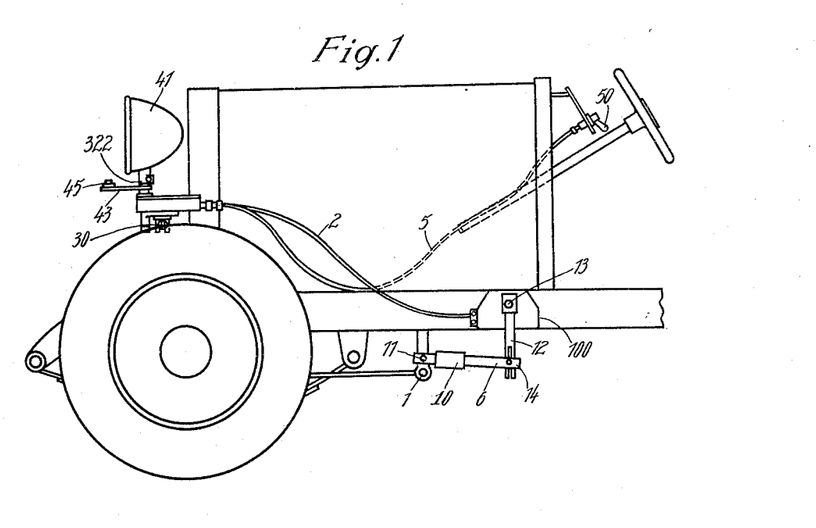
Fig. 1 represents the total lamp swivelling mechanism in side elevation.

Referring to Fig. 1, the steering arm 1 of the car functioning as transmitter, and being resiliently supported in relation to the car axle, is connected by a connecting rod 6, containing a safety device 10, with an intermediate operating lever 12 through a joint 14. The shaft 13 which is operated by lever 12 is journaled in box 100, which it enters through a bushing in the wall of the box as will be presently described in detail. From the gear in box 100 the motion is transmitted, by means of a relatively stiff, but flexible wire (Fig. 4) encased in a tube 2, to the gear contained in the box 300 located underneath the headlight 41. Box 300 is mounted on the cross-rod 30 between the mudguards which for the sake of clearness have been omitted in this figure. Headlight 41 is coupled with a pivot pin 322 which is journaled in box 300 which it enters with a water and dust proof fit. By the arm 43 and a connecting rod 45 the movement of the headlight 41 is transmitted to a second arm and a second headlight on the far side of the car (not shown), the pivot pin of which second light is likewise journaled in a gear box, shown in detail in Figs. 10 and 11.

Gear box 300 contains, as will be more fully described later on, all the parts of the gear which are required for the conversion of the steering wheel motion into the turning motion of the headlights under ordinary conditions, more particularly the gear portions which, in case of small wheel deflections, produce a substantially higher transmission ratio, for example of from three to six, than in case of greater wheel deflections. This average characteristic, determined by the dimensions and locations of the parts of the gear, is adaptable to the special design of the car by a simple change of the lengths of the driving elements, for instance by shifting the pivotal joint of lever 12, or by lengthening or shortening the transmission member guided in the tube 2.

From a handle 50 mounted within easy reach of the driver a further transmission member 5ª, for instance similar to wire 20, enclosed in a pipe 5 leads to the box 300 and is there connected with a device for disengaging the headlights from the steering mechanism and for simultaneously locking them in the straight ahead position.

After this general description we now proceed to enter into details.

Figure 2:
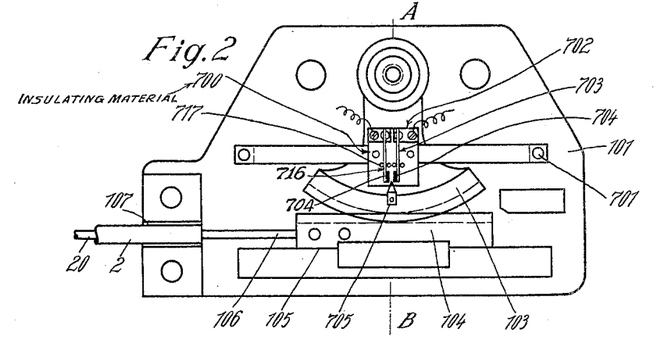
Fig. 2 represents the totally enclosed part of the gear nearest to the steering mechanism with the casing removed, on a larger scale in elevation.
Figures 3, 4:
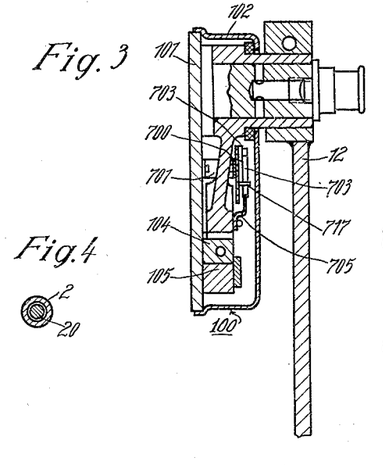
Fig. 3 represents a cross-section through Fig. 2 along the line A—B.
Figs. 4 to 7 represent details of the swivelling mechanism.

As shown in Figs. 2 and 3 box 100 consists of the baseplate 101, mounted on the body of the car and the cover 102. In the box is pivoted the toothed quadrant 103 which is keyed to the external operating lever 12. The teeth of the quadrant are engaged by the teeth of the rack 104 which is linearly guided in the guide 105. To this rack 104 is secured one end 106 of a flexible hardened steel wire 20. The guide tube 2 for this wire is rigidly clamped at the entrance to the box at 107.

Figure 5:
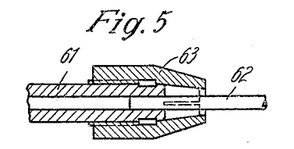
Figure 6:
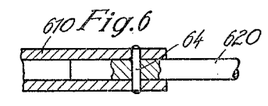
Figure 7:
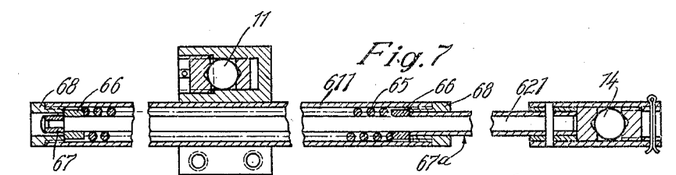

In Figs. 5 to 7 a number of modifications of the safety device 10 interposed, as indicated in Fig. 1, between the steering arm 1 and operating lever 12, are illustrated.

In Fig. 5 one portion of the connecting rod 6 of Fig. 1 has, for instance, the form of a tube 61 tapered and longitudinally slotted at the end, and the other portion has the form of a rod 62, which by means of the cap nut 63 is clamped in the split portion of the tube. If for any reason the turning gear of the headlights should bind anywhere the rod 62 is able to slide axially in the tube 61 in spite of the clamping arrangement, if considerable forces are developed. This safety device offers at the same time the advantage that after loosening the nut 63 the length of the connecting rod 6 in Fig. 1 may easily be adjusted as desired.

In Fig. 6 of the drawings this safety device consists of a pin 64 of soft metal, passed through a transverse common bore in tube 610 and rod 620, which pin is shorn off in case of extreme resistance.

In Fig. 7 the connecting rod 6 illustrated in Fig. 1 is likewise formed partly as a tube 611 in which the other part 621 is guided. Connection between part 621 and operating lever 12 of Fig. 1 is made by the ball joint 14. The tube 611 is connected with the steering arm 1 by a ball joint 11. The ball joints facilitate the application of the gear to the car since deviations of the axes of the levers 1 and 12 from the parallel position may thus be tolerated without any binding occurring. In normal operation the part 621 is ensured against displacement in the tube 611 by the spring 65 subjected to a preliminary tension, because even in the event of minute displacements the full preliminary tension of the spring becomes operative and this initial or preliminary tension is greater than the distributing forces developing in normal operation.

In case of undue stresses occurring in the transmission of motion to the headlights, spring 65 yields in either direction, due to the following arrangement.

Spring 65 is mounted within tube 611 upon rod 621 and confined on this rod between two collars 66 slidingly disposed on rod 621. The left hand collar 66 is prevented from sliding off rod 621 by a stop collar 67 fixed to the end of the rod. The right hand collar abuts against a long sleeve 67ª also fixed on rod 621. In mounting spring 65 it is given a suitable preliminary tension. Tube 611 is closed at both ends by the bushing 68 threaded into its ends and which serve at the same time as abutments for collars 66 when sleeve 67ª is pushed in, or withdrawn. The right hand bushing 68 besides serves as a guide for sleeve 67ª.

If, with such an arrangement, for any reason the turning gear should bind anywhere, and the steering gear is operated, rod 621 will either move further into or out of tube 611 and thereby compress spring 65 further from one end or the other. The length of the individual parts is so chosen that in case of such emergency motion at least half of the displacement path of the rack 104 can be taken up in this way, so that the steering device is not impeded in any manner.

The power transmitting member 20, contained in tube 2 (Fig. 1) and illustrated in Fig. 4 of the drawings, consists in the embodiment shown of a flexible steel wire of about 2 to 5 mm. diameter. Instead of steel any other suitable hard flexible material may be employed. This wire fills almost completely the interior of the guide tube 2. Preferably it should occupy about nine-tenths of the cross-section. The space between tube and wire is charged with a viscous lubricant. Binding and corrosion of the two elements is prevented by the lubricant and by selecting two different materials for them. Guide tube 2 has a continuous wall of flexible material, such as copper, brass or the like. By bending the tube into suitable shape this transmission device may easily be adapted to any type of car. The tube is installed along the body of the car, preferably with as slight, continuous curvature as possible, with the ends, at which it enters the respective casings, remaining straight. Experiments have shown that in spite of the comparatively great rigidity of the wire, the latter may be moved within the tube without appreciably increasing the load of the steering device. The friction set up thereby is even of advantage, because the transmission device acts in this way kinematically like a series of springs and brakes, one alternating with the other. The vibrations coming from the steering mechanism are damped in this way and kept away from the sensitive parts of the headlight gear. This elasticity is usually just great enough to enable the transmission device to absorb the amplitudes of the quick steering gear vibrations, but yet to follow the slower intended movements of the steering apparatus without lost motion. These foregoing features are advantages over so-called Bowden wire transmission, which latter involves always considerable lost motion.

The use of a comparatively rigid and strong guide tube prevents further the elastic changes of the body of the car during the travel from influencing the movements of the individual parts of the gear. It is, furthermore, sufficient to attach the guide tube to the body of the car at a few points only without danger of detrimental vibrations during the travel.

Figure 8:
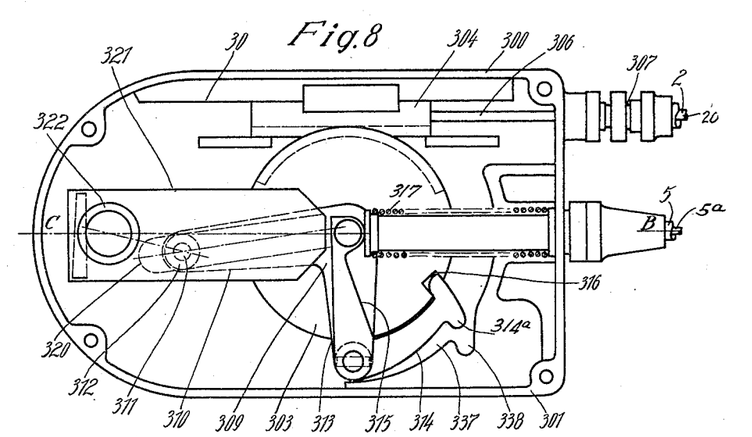
Fig. 8 represents the totally enclosed part nearest to the headlight with the cover removed.
Figure 9:
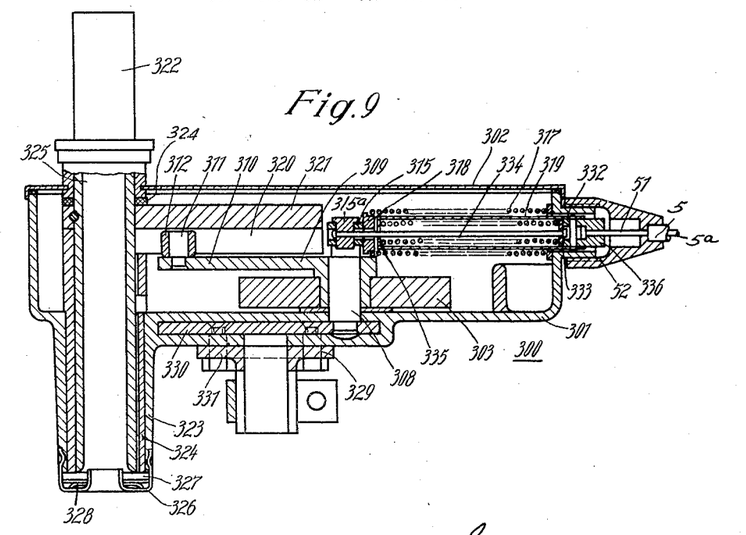
Fig. 9 represents the same part in cross-section along line C—D in Fig. 8.

The guide tube 2 is with its forward end tightly joined to box 300, Figs. 8 and 9, by means of an adjustable coupling 307. The box 300 consists of the casing 301 and the cover 302. The end 306 of the elastic wire is attached in the casing to a rack 304 linearly guided by a guide 305. This rack meshes with a disc 303 partly provided with teeth, as indicated by the dash line sector. This disc is journaled on an axle 308 mounted vertically on the bottom of casing 301. On the same axle is loosely mounted the bell-crank lever 309 which is at one end 310 provided with a crank pin 311 carrying an antifriction roller 312. At the end of the other arm 313 is pivoted a bell-crank, one arm of which consists of the pawl 314, forming part of a coupling mechanism. The other arm 315 of this bell-crank extends over the free end of axle 308 to the center of the disc 303. In the position shown pawl 314 engages the notch 316 of the disc 303. In this position disc 303 and bell-crank 109 are rigidly coupled together and the crank pin 311 consequently follows the rotation of the disc when operated by the motion transmitting wire as described. Coupling pawl 314 is normally forced into this coupling position by the pretensioned spring 317 which rests with one end on the plate 318 which bears against the end of crank arm 315 and with the other end against the wall of casing 301, and is guided on the sleeve 319. The disengaging gear for the coupling pawl 314 will be explained later.

Roller 312 of crank 310 runs in a slot 320 provided in an arm 321 rigidly mounted on the hollow shaft 322. Arm 321 with its slot 320 and crank 310 engaging the latter form a so-called slot-and-crank movement, by itself well known in the art. In the present case slot 320 is inclined with respect to the longitudinal axis of arm 321, for reasons which will appear later. Hollow shaft 322 carries one of the headlights of the car (not shown in Fig. 9). This shaft is journaled in a comparatively long bushing 324 disposed in a tubular socket 323 preferably integral with casing 301. At the top shaft 322 is carried through a packing 324 arranged in cover 302. At the lower shaft end the packing is effected by an annular sheet metal cup 326 clamped to the lower end of socket 323, and which contains a packing ring 327 and a leather ring 328. The box 300 is fixed to the headlight support by means of a detachable bracket 329. For connecting the bracket with the box there is attached to the bottom of the casing a die casting plate 330 with the riveted threaded bolt 331.

In the corresponding box 500 (Figs. 10 and 11) of the other headlight, which by the arm 43 and connecting rod 45, Fig. 1, is coupled to the first headlight and thus derives its motion from the latter, there is journaled in a similar manner the hollow headlight shaft 522, tightly packed where it passes through the cover 502. This box is provided with a device which tends to forcibly return the headlights from both deflected positions into the central or straight ahead position. This retrieving device is constructed as follows: In suitably arranged troughs 503, 504 with projecting stops 505 there are accommodated pre-tensioned springs 506 which abut with one end directly and with the other end through an interposed centrally perforated plate 507 against the stops 505. Through the springs and the bores of the plates pass rods 508 provided at their outer ends with rounded adjusting nuts abutting against the plates 507. These rods are at their other end pivotally attached to the ends of a double-armed lever 501 mounted on headlight shaft 522. When the headlight is turned towards one side the rod subjected to tension compresses its spring by means of its plate 507 while the other rod passes freely through the bore of the other plate.

Figure 10:
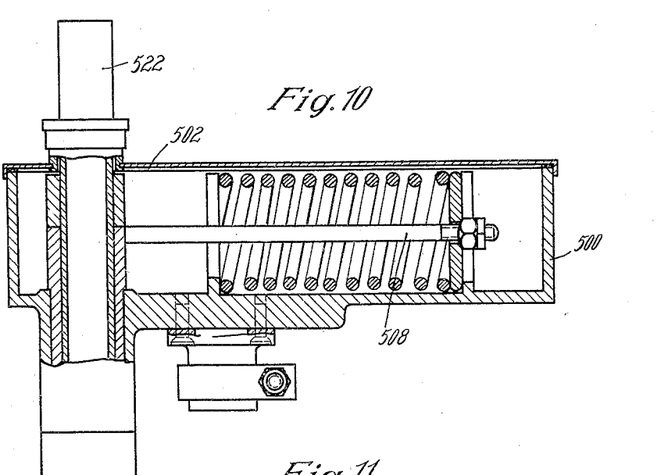
Fig. 10 represents a vertical section through a gear box for the second headlight corresponding in shape with the gear box shown in Fig. 8 for the first headlight.
Figure 11:
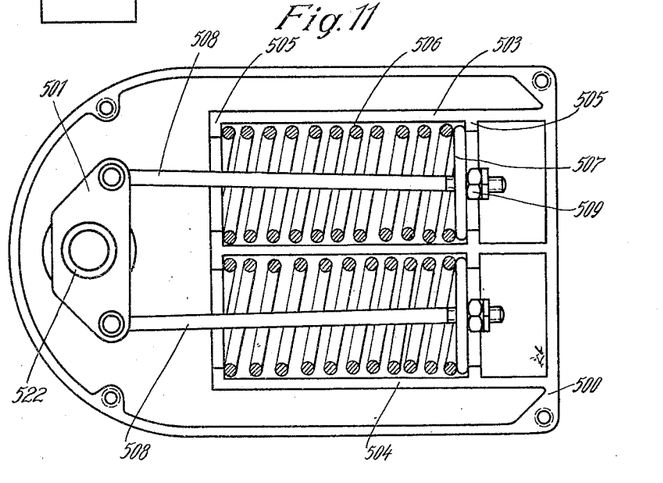
Fig. 11 represents a plan view of the open box shown in Fig. 10.

This retrieving device with the pre-tensioned springs in conjunction with the flexible power transmitting member 20 effectively prevents the transmission of vibrations to the headlight.

If it is desired to uncouple the headlights from the steering gear in order to prevent unnecessary wear of the turning gear, for instance when driving during the day, the driver need only turn the handle 50, Fig. 1, on the dashboard This handle, which is connected to a draw wire 51 (whose other end is shown in Fig. 9) may be rotatably guided in a high pitch screw thread, so that by turning the handle wire 51 is also axially moved. Handle 50 may be locked in its end positions in any conventional manner, such as notches or the like. The draw wire is guided in a tube 5 and is connected to the end of the pawl lever 315 through the interposal of a tensioning device containing the pre-tensioned spring 332 which tends to pull the draw member away from the handle. By pulling the member 51 in the direction of the handle the tensioning device is charged if for reasons mentioned later on the pawl lever 315 is unable to follow the pull.

The tensioning device is composed as follows: The spring 332 abuts at one end against the plate 333 which is connected with bell-crank arm 315 by means of a rod 334, pivoted to the end of arm 315 at 315ᵃ. The other end of spring 332 abuts against the annular bottom 335 of sleeve 319 serving as guide for the springs 332 and 317 and secured at its other end to a head 336 in which draw member 51 is fastened. This head acts at the same time as stop for the plate 333 and prevents a slackening of the spring 332.

Along the path of the coupling pawl 314 there is arranged the guide track 337, having a contour concentric with the pivot pin 308. The proximity of this track to the periphery of disc 303 is such that it prevents on rotation of disc 303 in either direction from the position shown, the disengagement of the pawl head 314ᵃ from the notch 316, but permits such disengagement when the headlight is in the straight ahead position shown. Then the pawl head 314ᵃ is able to drop into the recess 338 of the guide track, and in doing this locks the headlight in the straight ahead position. In the position of pawl 314 shown, arm 315 can be operated by pulling wire 51 without thereby further tensioning spring 332. If the disc should stand in any other position and the wire is pulled by means of the handle 50 and the latter locked in the pulled up position by suitable means referred to hereinbefore, the sleeve 319 is pulled back without rod 334 thereby putting spring 332 under further tension. If now the headlight operating gear attains the straight ahead position shown in Fig. 8, coupling pawl 314 is automatically thrown out of engagement with disc 303 and locked in recess 338 by the action of spring 332, while the tension of the spring is relaxed to normal. The parts of the operating gear coupled directly with the headlights are thus locked, while the parts coupled with the steering gear including disc 303 are freely movable. The tube 5 of the draw wire is tightly joined to the box 300 by means of a coupling nut 52.

Our improved device has the advantage that when the coupling is thrown out of engagement the headlights are locked in the straight position. The handle for the coupling can furthermore be comfortably operated from the driver's seat at any time and independent of the headlight position. It consists of simple, reliable parts easily adaptable to the various types of cars. The locking in the straight forward position also facilitates the adjustment of the headlight gear when fitting the device to the car because it is merely necessary to put the steering mechanism straight in order to adjust the flexible power transmitting element for the correct length. The fine adjustment of the length of this part takes place by means of the adjustable coupling screw 307 at the box 300, by simply setting the end of the tube 2 more or less close to the box.

Figure 12:
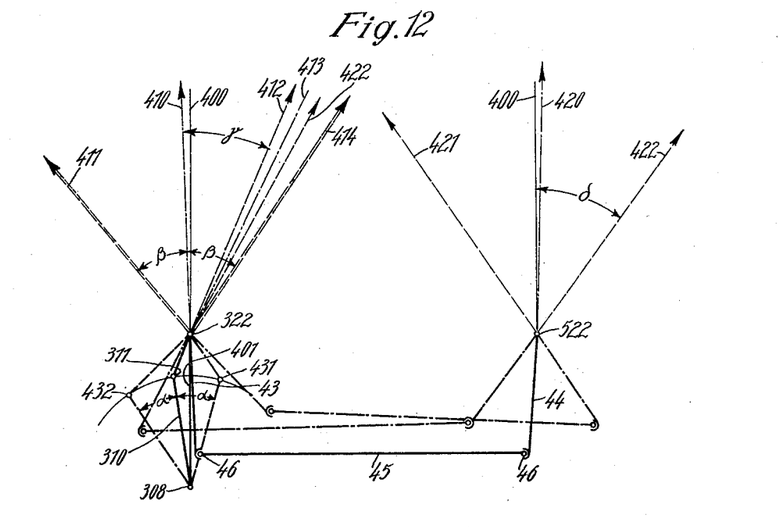
Fig. 12 represents a characteristic angular speed diagram of the apparatus.

The movement characteristic of the turning gear will now be described with reference to the Fig. 12.

Referring to this figure, 308 represents the axis of rotation of bell-crank arm 310 with the crank pin 311 at its end as shown in Figs. 8 and 9. The slotted link 321 has been omitted for the sake of clearness. Only the connecting line between the pin 311 and the headlight spindle 322 is shown. The spindle or pivot pin is by the arms 43, 44 and connecting rod 45 and by ball joints connected with the pivot pin 522 of the second headlight. In the straight ahead position the parts 43, 45, 44 form three sides of a symmetrical trapeze.

The optical axes 410, 420 of the headlight are for straight ahead travel normally turned outwardly from the straight ahead direction 400 by approximately 2° in order to increase the dispersion of the double beam of light. Assuming that the cars have to keep to the right when passing one another, the crank 310 is for normal straight ahead travel displaced to the left viewed in the direction of travel by about 7° from the straight position 401, for the following reason: In the straight position 401 the crank link gear has the highest ratio of transmission. In the tangential position in which bell-crank arm 310 stands at right angles to slot 320 of arm 321 in Fig. 8, the ratio of transmission is zero, inasmuch as, when keeping to the right the larger portion of the road is located on the left, the headlights are according to the invention in case of left-hand curves deflected to the left through a much greater angle (see the two left hand arrows 411, 421 for the two lights), for the purpose of completely illuminating the road for the turn, than in case of right-hand curves of equal curvature when the headlights encounter the nearer right-hand edge of the road much earlier, the latter position of the two lights being indicated by arrows 412, 422. In order to obtain this difference in the deflections of the headlights the crank-pin 311 which for straight ahead travel is located slightly outside the range of the maximum transmission ratio is in case of left-hand curves moved through this range toward the right into the position 431, and in case of right-hand curves towards the range of smaller transmission ratios into the position 432. In the event of equal deflections α of the crank 310 from normal position 311 toward the right and left, a considerably greater headlight deflection is therefore obtained toward the left, than toward the right.

The above holds good for small and medium deflections. In case of great deflections the main point is that the headlights should not be deflected too far toward the inside of the curve mainly because they should not return too late into the normal position when the steering wheels are straightened. In consequence of the required unsymmetrical setting of arm 310, an excessively large end deflection for left-hand curves would result in case of a large deflection of the steering gear to the left, if for arm 321 in Fig. 8 the customary central longitudinal slot were used, because the entire range of maximum transmission ratio is then traversed. To prevent this the slot 320 of arm 321, as shown in Fig. 8, is placed obliquely at the same angle at which bell-crank arm 310 is displaced for straight ahead travel as described before. This brings about that in case of left-hand curves the tangential position of the slot to arm 310, that is the range of the smallest transmission ratio is reached sooner than in case of radial slots. The oblique position of the slot in arm 321 is also of advantage for the end deflections in right-hand curves where the end deflection would be too small with radially disposed slots because the movement here takes place outside the range of the highest transmission ratio. The obliquity of the slot here brings about that the tangential position is attained later and that thereby the end deflection is correspondingly increased.

According to a further development not only the right-hand and left-hand deflections are different, but the two headlights are also coupled for different deflections relatively to each other through the trapezoidal form of the link system 43, 45, 44, with the object of avoiding a reduction of light dispersion produced by the two beams when moving the lights in either direction from the straight forward position, at which movement the beams would otherwise converge. Furthermore, while maintaining the desired diversion of the beams, arrangements are provided which at the same time keep in traversing a curve the outside headlight beam closer within the range of the straight ahead position to properly illuminate the roadside when passing into the straight road. In Fig. 12 holding good for mean deflections the divergence of the lights becomes noticeable particularly in the case of right-hand curves. Here the deflection of the left-hand headlight is considerably smaller than the deflection of the right-hand headlight. For comparison the beam arrow 422 of the right-hand headlight has been entered in the diagram of the left-hand headlight, which shows that the angle included by arrow 413 is smaller than the angle included by arrow 422. In addition the right-hand deflection of the left light is considerably smaller than its left-hand deflection. In order to show this difference, arrow 411, indicating left-hand deflection, has been also entered at the same angle β to the right of the straight ahead line 400 and been indicated by 414.

The entire device as shown is arranged for a left-hand drive car, i. e. one which has the steering wheel at the left. For right-hand drive the right-hand headlight is operated from the steering gear and the motion of the left-hand headlight derived therefrom.

Figures 13, 14:
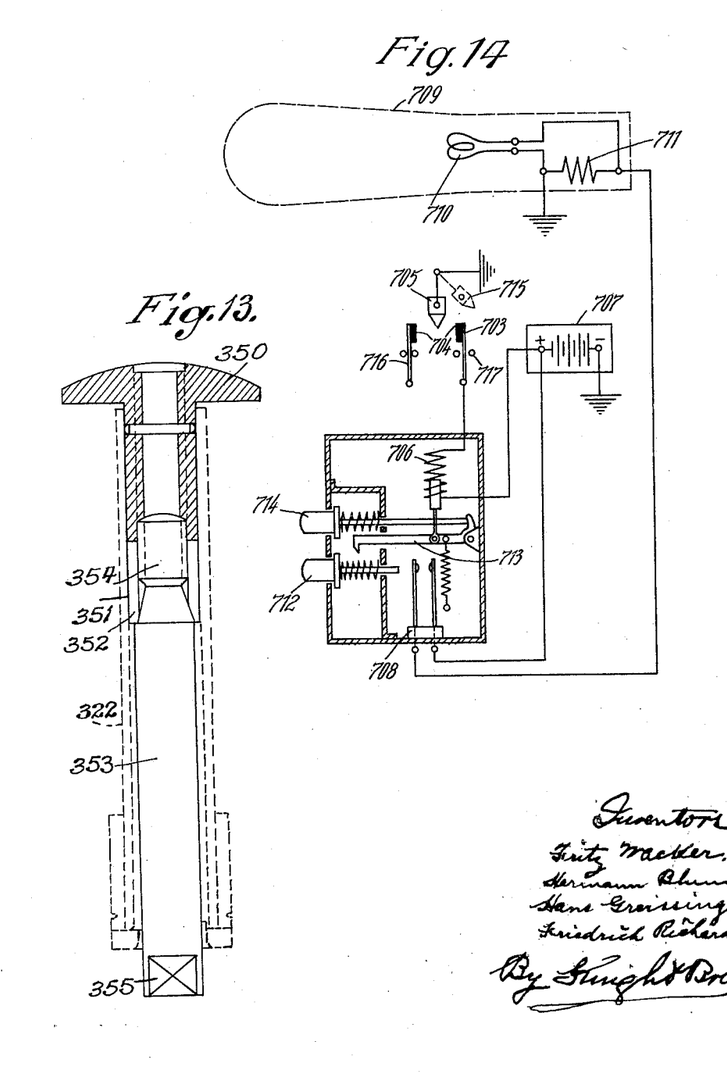
Fig. 13 represents a clamping device for mounting a headlight on its gear box.
Fig. 14 represents the wiring diagram of a direction indicator cooperating with the steering gear.

By means of the clamping device shown in Fig. 13 headlights with spherical seats may easily be mounted in the hollow shaft 322, Fig. 9. The clamping device consists of the tubular supporting member 350 with internal thread suitable for the headlight and split at the lower end at 351 and tapering at 352, and of the bolt 353 tapered correspondingly and provided with the threaded end 354 and a square socket portion 355 at its lower end for inserting a key. The clamping piece 350 is introduced from the top into the hollow shaft 322 indicated in broken lines. By turning the bolt 353 at 355 it is screwed into the supporting piece 350. The split portion of the support is then spread apart and firmly clamped against the inside of the tubular shaft.

In the box 100, Figs. 2 and 3 is also housed the contacting device for turning the direction indicator or semaphore with which some cars are equipped back into the inoperative position. For this purpose an insulating plate 700 is secured in position above the toothed quadrant 103 by means of a bridge bracket 701, which plate carries two terminal blocks 702, upon each of which is mounted a contact spring 703 and 716 respectively. These springs are spaced apart and parallel to one another, and carry at their ends on the sides facing each other insulating pieces 704. They cooperate with the pointer-like contact 705 mounted on the toothed quadrant mentioned at the beginning, which contact in the straight ahead position of the headlight gear shown in Fig. 2 stands between the insulated ends 704 of these springs. The connection and mode of operation of the contact device will now be described with reference to Fig. 14. The pointer contact 705 is electrically connected with the body at which the negative terminal of the operating storage battery 707 is usually grounded. Contact spring 703 is connected with the positive pole of the battery 707 through a trip coil 706. To the same battery is connected a parallel independent circuit including the contact device 708 which has the tendency to open, and further the well known circuit devices for the direction pointer or semaphore device 709, such as lamp 710 and the operating magnet 711. Contact device 708 is closed by depressing button 712, and the direction pointer 709 is rendered operative thereby, being thrown into the horizontal position shown in dotted lines. In the depressed position the push button 712 is detained by the pawl 713 which may be released by hand by the push button 714 or by energizing electromagnet 706 when pointer 705 of the headlight turning device contacts with spring 703. When push button 712 is thus released the direction pointer circuit is opened and the semaphore arm 709 drops. Two semaphore arms, one on each side of the car, are usually provided. Thus contact spring 716 is connected into a releasing circuit of the second semaphore device, not shown here, but similar in all respects to the one controlled by spring 703. Before the operator turns from the straight ahead travel he signifies his intentions by operating the pertaining semaphore device 709.

In order to save the operator dropping the semaphore by operatng push button 714 after he has negotiated the turn, the aforedescribed automatic return of the semaphore is provided which operates in the following manner: When negotiating a turn the contact 705 swings outward, into the position 715 for instance. When the car is straightened out after the turn this contact returns into the straight ahead position 705 and in doing so encounters the contact spring 703 just before reaching this position. In this way the circuit of the trip coil 706 is closed and the direction pointer set by hand is dropped as described before. The insulating end blocks 704 on the inside of the contact springs prevent that the direction pointer is dropped when contact 705 moves outwardly with the headlight gear on entering the turn. When turning the wheels to make the turn the contact 705 thus slides over the insulation 704 without closing a circuit. In order to prevent excessive wear of the contact springs by contact 705 in both directions, each spring passes near its end between two pins 717, which place the pivot of the spring closer to the free end.

It will be understood that changes and modifications may be made in the structures without departing from the spirit of our invention or the scope of our appended claims.

Having now particularly described and ascertained the nature of our invention and in what manner the same is to be performed, we declare that what we claim is:

1. In a device of the kind described, at least one turnable headlight mounted on the vehicle, a ratio gear interposed between the headlight and the steering gear of the vehicle, a travel direction indicator movably mounted on the body of the vehicle, means for operating said direction indicator by hand, and means for returning said indicator controlled by a part of the said gear.

2. In a device of the kind described, at least one turnable headlight mounted on the body of the vehicle, means for connecting the readlight with the steering gear of the vehicle containing at least one totally enclosed rotary member, a movable contact connected with the said rotary member, two stationary yielding contacts rigidly connected with the case of said rotary member and located at both sides of said movable contact in the straight-ahead position of the turning gear, non-conducting coverings at the sides of the stationary contacts facing the movable contact, at least one direction indicator mounted at the body of the vehicle, means for setting the direction indicator by hand, and an electro-magnetic return gear for said direction indicator, and circuit connections including said springs, and said movable contact for operating said return gear when said movable contact closes the circuit at one of said springs.

3. In a device for turning a pair of vehicle headlights in accordance with the steering gear deflections, in combination a transmission gear interposed between the steering gear and one of the headlights, said transmission gear having a variable gear ratio to impart to the headlights greater deflections at small steering gear angles, and smaller deflections at large steering gear angles, and a coupling gear between the two headlights, adapted to spread the two light beams the further apart, the more the headlights are deflected.

4. In a device for turning a pair of vehicle headlights in accordance with the steering gear deflections, in combination a transmission gear interposed between the steering gear and one of the headlights, said transmission gear having a slot-and-crank movement to impart to the headlights greater deflections at small steering gear angles, and smaller deflections at large steering gear angles, and a coupling gear between the two headlights, adapted to spread the two light beams the further apart, the more the headlights are deflected.

5. In a device for turning a pair of vehicle headlights in accordance with the steering gear deflections, in combination a transmission gear interposed between the steering gear and one of the headlights, said transmission gear having a slot-and-crank movement connection with one of the headlights to impart to the headlight greater deflections at small steering gear angles, said movement having its component elements angularly shifted from a straight alignment position by a slight amount when the headlight is in a straight ahead position, and a coupling gear between the two headlights, adapted to spread the two light beams the further apart, the more the headlights are deflected.

6. In a device for turning a pair of vehicle headlights in accordance with the steering gear deflections, in combination a transmission gear interposed between the steering gear and one of the headlights, said transmission gear having a slot-and-crank movement connection with one of the headlights to impart to the headlight greater deflections at small steering gear angles, and smaller deflections at large steering gear angles, said movement having its slot element connected to said headlight and the slot in said element directed at a suitable angle to the longitudinal axis of the slot element, and a coupling gear between the two headlights, adapted to spread the two light beams the further apart, the more the headlights are deflected.

7. In a device for turning a pair of vehicle headlights in accordance with the steering gear deflections, in combination a transmission gear interposed between the steering gear and one of the headlights, said transmission gear having a slot-and-crank movement connection with one of the headlights to impart to the headlight greater deflections at small steering gear angles, and smaller deflections at large steering gear angles, said movement having its slot element connected to said headlight and the slot in said element directed at a suitable angle to the longitudinal axis of said element and having its slot and crank elements angularly shifted from a straight alignment position by a slight amount when the headlight is in a straight ahead position, and a coupling gear between the two headlights, adapted to spread the two light beams the further apart, the more the headlights are deflected.

8. In a device for turning a pair of vehicle headlights in accordance with the steering gear deflections, in combination a transmission gear interposed between the steering gear and one of the headlights, said transmission gear having a variable gear ratio to impart to the headlights greater deflections at small steering gear angles, and smaller deflections at large steering gear angles, and a coupling gear between the two headlights, adapted to spread the two light beams the further apart, the more the headlights are deflected, said coupling gear comprising two arms connected respectively to said headlights and shifted at slight but opposite angles to the light beam axes when the lights stand in a straight ahead position, and a connecting rod pivotally attached to the ends of said arms.

9. In a device for turning a pair of vehicle headlights in accordance with the steering gear deflections, in combination a steering gear motion transmitter, completely encased and connected with the vehicle steering gear, a completely encased motion receiver connected with one of the headlights, and having an operating gear adapted to deflect said headlight at large angles for small steering gear angles, and at small angles for large steering gear angles, an encased flexible connection between said transmitter and receiver, and a coupling between said two headlights for simultaneously operating both lights to spread the light beams the further apart from their normal parallel relation in the straight ahead position, the further the headlights are deflected.

10. In a device for turning a pair of vehicle headlights in accordance with the steering gear deflections, in combination a steering gear motion transmitter, completely encased and connected with the vehicle steering gear, a completely encased motion receiver connected with one of the headlights, and having an operating gear adapted to deflect said headlight at large angles for small steering gear angles, and at small angles for large steering gear angles, an encased flexible connection between said transmitter and receiver, and a coupling between said two headlights for simultaneously operating both lights, the second, coupled headlight having a completely encased retrieving device tending to force both headlights into and to hold them in the normal straight ahead position.

11. In a device for turning a pair of vehicle headlights in accordance with the steering gear deflections, in combination a steering gear motion transmitter, completely encased and connected with the vehicle steering gear, a completely encased motion receiver connected with one of the headlights, and having an operating gear adapted to deflect said headlight at large angles for small steering gear angles, and at small angles for large steering gear angles, a flexible, but relatively stiff wire connecting said transmitter and receiver, said wire being encased in a sheath of only slightly larger inner diameter than the wire, whereby the desired gear motions are transmitted but the undesired normal steering gear vibrations are substantially absorbed, and a coupling between said two headlights for simultaneously operating both lights.

12. In a headlight moving device, in combination, at least one turnable headlight mounted on the vehicle, a ratio gear having variable gear ratio, which ratio is substantially greater for small wheel obliquities than for large ones, and being connected with the headlight, transmitting means adapted to connect said ratio gear with a part of the steering gear resiliently supported in relation to the wheel axes, and a return device adapted to force the headlight from both positions of deflection into the straight-ahead position, said device comprising a double armed lever connected with said headlight, a pair of helical pre-tensioned springs located substantially parallel to one another and being connected at their ends with the ends of said double armed lever, and a box enclosing said return device.

13. In apparatus of the kind described, in combination, at least one turnable headlight mounted at the body of the vehicle, a ratio gear having variable gear ratio which ratio is substantially greater for small wheel obliquities than for large ones, and being connected with the headlight, transmitting means adapted to connect said ratio gear with a part of the steering gear resiliently supported in relation to the wheel axes, and a totally enclosed return device adapted to force the headlight from both positions of deflection back into the straight-ahead position, said device comprising a double-armed lever, two pre-tensioned substantially parallel helical springs, two connecting rods disposed in the interior of said springs and being pivoted at one of their ends to the arms of said lever and being applied at their other end respectively to the ends of said springs facing away from said lever.

14. In apparatus of the kind described, in combination, at least one turnable headlight connected at the body of the vehicle, a ratio gear having variable gear ratio which ratio is substantially greater for small wheel obliquities than for large ones, said gear being interposed between said headlight and a part of the steering gear resiliently supported in relation to the wheel axles, a totally enclosed return device adapted to force the headlight from both directions of deflection back into the straight-ahead position, said device comprising a double-armed lever connected with the headlight, two at least substantially parallel helical springs, guide members enveloping said springs and serving as an abutment for one end of each spring near said lever, an end plate for the free end of each spring, each plate abutting against the guide member for each spring, two connecting rods each pivoted to one of the ends of said lever and each being disposed in the interior of one of said springs and passing through the center of the pertaining spring plate, and a head on the protruding end of each rod, engaging the outside face of its plate to tension its spring when the lever pulls the rod through the spring, both of said springs tending to hold the headlight in a straight-ahead position against vibrations incident to the motion of the vehicle.

15. In a device for turning the headlights of vehicles in dependence of the obliquity of the steering wheels, in combination, a ratio gear located underneath one of the headlights in a suitable case, said gear having a variable gear ratio which is substantially greater for small wheel obliquities than for large wheel obliquities, and a releasable clutch included in said gearing to control the connection between the steering wheel and the headlight, a first flexible power transmitting element connecting said gear with a part of the steering gear resiliently supported in relation to the wheel axles, a second flexible power transmitting element connecting said clutch with a handle within reach of the driver, and tubes enveloping and guiding said power transmitting elements and being tightly jointed to said case.

16. In a device of the kind described, at least one headlight pivotally mounted on the vehicle body, a ratio gear with a gear ratio substantially greater for small angles of deflection than for large angles and containing two coaxially journalled rotary members, one forming a part of the driving element and the other a part of the driven element of the gear, a controllable coupling pawl interposed between said two rotary members and located on the driven rotary member and adapted to engage the driving rotary member, a stationary guide track located concentrically to the axes of rotation of the said members and adapted to hold said pawl in the engaged position when the headlights are deflected, said guide track having a recess at the point of the pawl location for straight-ahead position, said recess receiving and detaining said pawl when said pawl is thrown out of engagement with the driving rotary member.

17. In a device of the kind described, at least one headlight pivotally mounted on the vehicle body, a ratio gear with a gear ratio substantially greater for small angles of deflection than for large angles and containing two coaxially journalled rotary members, one forming a part of the driving element and the other a part of the driven element of the gear, a controllable coupling pawl interposed between said two rotary members and located on the driven rotary member and adapted to engage the driving rotary member, said pawl having an operating arm terminating at the axis of said rotary members, and a flexible power transmitting element, connected to the end of said operating arm and having an operating handle at its other end located near the driver's seat for engaging and disengaging said clutch pawl at will.

18. In a device of the kind described, at least one headlight pivotally mounted on the vehicle body, a ratio gear with a gear ratio substantially greater for small angles of deflection than for large angles and containing two coaxially journalled rotary members, one forming a part of the driving element and the other a part of the driven element of the gear, a controllable coupling pawl interposed between said two rotary members and located on the driven rotary member and adapted to engage the driving rotary member, a pre-tensioned spring tending to force said pawl into the position of engagement, a power transmission member connected to said pawl and having a handle at its other end near the driver's seat, a tensioning gear located between said pawl and said transmission member having a pre-tensioned spring, the spring power of the last-named spring being throughout greater than the power of the spring for throwing the pawl into engagement.

19. In a device of the kind described, at least one headlight pivotally mounted on the vehicle body, a ratio gear with a gear ratio substantially greater for small angles of deflection than for large angles and containing two coaxially journalled rotary members, one forming a part of the driving element and the other a part of the driven element of the gear, a controllable coupling pawl interposed between said two rotary members and located on the driven rotary member and adapted to engage the driving rotary member, said pawl having an operating arm terminating at the axis of said rotary members, and a flexible power transmitting element, connected to the end of said operating arm and having an operating handle at its other end located near the driver's seat for engaging and disengaging said clutch pawl at will, a pre-tensioned helical spring having a fixed abutment at one end and engaging the end of said lever arm at the other end, thereby tending to force the coupling pawl into coupling position, a second pre-tensioned helical spring located within the first-named spring and having its end facing away from the end of the pawl lever connected with said lever end, said second spring having its other end connected with said power transmitting member, the preliminary tension of said second spring being of greater power than that of the first spring.

20. In a device for swinging headlights by the steering gear of a vehicle, at least one casing, a hollow shaft moisture and dust proof passed with one end through the wall of said casing and being journalled with the other end in a tubular continuation of the opposite wall of said casing, a channeled ring having a packing ring in the bottom of its channel and embracing in its channel the end of said tubular continuation and of the hollow shaft, means of attaching said headlight to said hollow shaft at least partially located in the interior of said shaft, and means for connecting said shaft with the steering gear of the vehicle.

21. In a device for swinging headlights by the steering gear of a vehicle, at least one casing, a hollow shaft rotatably and tightly journalled in said casing, means for connecting said shaft with the steering gear of the vehicle, a tapering clamping device in the interior of said shaft, the upper part of said clamping device being connectable with the headlight, the lower part of said clamping device having a wrench socket for operating the clamping device.

In testimony whereof we affix our signatures.

FRITZ WACKER.
HERMANN BLUM.
HANS GREISSINGER.
FRIEDRICH RICHARD DIETRICH.